US00RE39687E

(19) United States
(12) Reissued Patent
Choi

(10) Patent Number: US RE39,687 E
(45) Date of Reissued Patent: Jun. 12, 2007

(54) TRAY DRIVING APPARATUS FOR A MICROWAVE OVEN AND A MICROWAVE OVEN HAVING THE SAME

(75) Inventor: Won-Woo Choi, Suwon (KR)

(73) Assignee: Samsung Electronics Co., Ltd., Suwon-si, Gyeonggi-do (KR)

(21) Appl. No.: 10/225,285

(22) Filed: Aug. 22, 2002

Related U.S. Patent Documents

Reissue of:
(64) Patent No.: 6,107,615
Issued: Aug. 22, 2000
Appl. No.: 09/387,560
Filed: Sep. 1, 1999

(30) Foreign Application Priority Data

Jun. 18, 1999 (KR) ..... P99-22930

(51) Int. Cl.
*H05B 6/78* (2006.01)

(52) U.S. Cl. ..... 219/754; 219/762; 108/20
(58) Field of Classification Search ..... 219/754, 219/755, 752, 753, 726, 762; 108/20; 126/338
See application file for complete search history.

(56) References Cited

U.S. PATENT DOCUMENTS

| | | | | |
|---|---|---|---|---|
| 3,633,491 A | | 1/1972 | Williams | |
| 3,952,607 A | | 4/1976 | Ring | |
| 4,239,009 A | * | 12/1980 | Cunningham | 219/755 |
| 4,286,133 A | * | 8/1981 | Einset et al. | 219/753 |
| 4,562,771 A | | 1/1986 | Williams | |
| 4,581,989 A | | 4/1986 | Swartley | |
| 4,636,605 A | | 1/1987 | Berend et al. | |
| 4,694,132 A | * | 9/1987 | Liu | 219/755 |
| 4,808,781 A | | 2/1989 | Liu | |
| 4,885,446 A | | 12/1989 | Liu | |
| 5,117,079 A | | 5/1992 | Morino et al. | |
| 5,199,393 A | | 4/1993 | Baldassini | |
| 5,639,497 A | | 6/1997 | Bedford et al. | |
| 5,672,291 A | * | 9/1997 | Han | 219/753 |
| 5,877,479 A | | 3/1999 | Yu | |
| 5,986,249 A | | 11/1999 | Yoshino et al. | |
| 6,076,957 A | | 6/2000 | Gomes | |

FOREIGN PATENT DOCUMENTS

| | | | | |
|---|---|---|---|---|
| EP | 781 074 A3 | | 6/1997 | |
| EP | 781 074 A2 | | 6/1997 | |
| JP | 1-189423 | * | 7/1989 | 219/726 |
| JP | 1-292793 | * | 11/1989 | 219/754 |
| JP | 1-314818 | * | 12/1989 | 219/754 |
| JP | 2-25639 | * | 1/1990 | 219/726 |

* cited by examiner

*Primary Examiner*—Philip Leung
(74) *Attorney, Agent, or Firm*—Robert E. Bushnell, Esq.

(57) ABSTRACT

A tray driving apparatus for a microwave oven and a microwave oven having the same including a speed changing unit for enhancing the cooking quality by periodically changing the rotational speed of the tray to more evenly radiate a microwave to food. The speed changing means includes a driving gear unit having a plurality of driving gears and mounted to the driving shaft; and a driven gear unit having a plurality of driven gears corresponding to respective driving gears of the driving gear unit, and mounted to the driven shaft. The gears of any one of the driving gear unit and the driven gear unit are portion gears which are gears having gear teeth on respective portions of outer peripheries thereof, the gear teeth of the portion gears are alternately disposed to each other one on another. Accordingly, upon a rotation of the driving shaft, each portion gear of any one of the driving gear unit and the driven gear unit are alternately meshed with a corresponding gear of the other one of the driving gear unit and the driven gear unit, to thereby change the rotational speed of the tray.

31 Claims, 3 Drawing Sheets

TRAY DRIVING APPARATUS FOR A MICROWAVE OVEN AND A MICROWAVE OVEN HAVING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a microwave oven for cooking food placed on a rotating tray by using a microwave, and more particularly, to a tray driving apparatus for a microwave oven and a microwave oven having the same for enhancing the cooking quality by periodically changing the rotational speed of the tray to much more evenly radiate [a microwave] *microwaves* to the food.

2. Description of the Prior Art

A microwave oven is a device for cooking food by using [a microwave] *microwaves* generated from a magnetron. The principle is that the [microwave cooks] *microwaves cook* food from its interior by heating molecules of water included in the food. The microwave oven is more widely used since the microwave oven has clear advantages in a higher thermal efficiency, more rapid heating, and less loss of nutrients.

Such a microwave oven, as shown in FIG. 1, has a cooking chamber 12 and a driving chamber 14 in the body 10. The cooking chamber 12 is a portion in which food is placed and cooked and on the front side of which a door is mounted to be opened and closed. A tray 16 for placing food is mounted on the bottom of the cooking chamber 12. The driving chamber 14 has various electric components and parts such [a] *as* magnetron 17, a high voltage transformer 18, a waveguide, a cooling fan 19, and a control part to generate and radiate [a microwave] *microwaves* into the cooking chamber 12. A control panel 30 is prepared on the front side of the driving chamber 14 in order for a user to set various cooking modes and to operate the microwave oven.

If the electric components in the driving chamber 14 are operated, [a microwave] *microwaves* generated in the magnetron 17 [is] *are* guided to the cooking chamber 12 through the wavelength 17. The [microwave] *microwaves* guided in the cooking chamber 12 [is] *are* directly radiated to food or indirectly radiated to food while being reflected from the walls of the cooking chamber 12. The [microwave radiated to food generates] *microwaves radiated to the food generate* heat by vibrating water molecules of food. Then food is cooked by the generated heat.

In the meantime, in general, according to the shape of the cooking chamber 12, and the shape and size of food placed on the tray 16, the microwave distribution in the interior of the cooking chamber 12 changes, as well as continuously changing with respect to time. According to this, since the [microwave is] *microwaves are* not evenly radiated to the entire food, the respective portions of food are differently cooked, thus the cooking quality is degraded.

In order to solve such a phenomenon, a general microwave oven has a tray driving apparatus for rotating the tray 16. It is experientially known that [a microwave is] *microwaves are* more evenly radiated to food to enhance the cooking quality if food placed on the tray 16 is rotated by the tray driving apparatus.

Such a tray driving apparatus, as shown in FIG. 2, has a driving source 42, and a driving shaft 44 for transmitting the driving force to the tray 16. A general motor is used for a driving source, and a plurality of gears are included for reducing the number of rotations of the motor which is rotated at a high speed, and for transmitting a driving force to the driving shaft 44.

If cooking starts, the driving source 42 generates a driving force, and the driving force is transmitted to the tray 16 through the driving shaft to slowly rotate the tray 16. According to this, food placed on the tray 16 is rotated at a predetermined speed, and [the microwave is] *microwaves are* evenly radiated to food. Reference numeral 13 in FIG. 2 denotes the bottom panel of the body 10 which forms the bottom portion of the cooking chamber, and reference numeral [46] *42* is a connection [member] which connects a shaft 44 with respect to the tray ([or called] *also called a* rotary tray) 16.

In the meantime, if the tray is rotated at a constant speed, in the case that [a] microwave distribution with respect to time in the interior of the cooking chamber 12 changes according to the rotational speed of the tray 16, the respective portions of food are differently cooked due to the uneven radiation of [the microwave to] *microwaves to the* food even though the tray 16 is rotated. Accordingly, the cooking quality is deteriorated.

SUMMARY OF THE INVENTION

In order to solve the above problem, it is an object of the present invention to provide a tray driving apparatus for a microwave oven and a microwave oven having the same for enhancing the cooking quality of food by periodically changing the rotational speed of the tray and for more evenly radiating [a microwave to] *microwaves to the* food.

In order to achieve the above object, the tray driving apparatus of the microwave oven according to the present invention includes a driving source; a driving shaft rotated by the driving source; a driven shaft connected to the tray and rotated together with the tray; and speed changing means for changing the rotational speed of the tray by changing the ratio of the rotational speed transmitted from the driven shaft to the driving shaft.

The speed changing unit includes a driving gear unit having a plurality of driving gears, and mounted to the driving shaft; and a driven gear unit having a plurality of driven gears corresponding to respective driving gears of the driving gear unit, and mounted to the driven shaft. The gears of any one of the driving gear unit and the driven gear unit are portion gears which are gears having gear teeth on respective portions of outer peripheries thereof, so that, upon a rotation of the driving shaft, each portion gear of any one of the driving gear unit and the driven gear unit are alternately meshed with a corresponding gear of the other one of the driving gear unit and the driven gear unit, to thereby change the rotational speed of the tray.

Accordingly, upon a rotation of the driving shaft, each portion gear of any one of the driving gear unit and the driven gear unit is alternately meshed with a corresponding gear of the other one of the driving gear unit and the driven gear unit, to thereby change the rotational sped of the tray.

Here, the gear teeth of each portion gear is formed on a plurality of portions of the outer periphery of each portion gear.

In the meantime, the above object can be achieved in the microwave oven according to the present invention which includes a body in which a cooking chamber is formed; a high frequency (or called 'microwave') generator for generating and radiating a high frequency into the interior of the cooking chamber; a tray mounted to be rotated on the bottom of the cooking chamber in order for food to be securely placed; a driving source for providing a driving force for rotating the tray; a driving shaft rotated by the driving source; a driven shaft connected to the tray and rotated together with the tray; a driving gear unit having a plurality of driving gears and mounted to the driving shaft; and a driven gear unit having a plurality of driven gears corresponding to the plurality of driving gears, and mounted to the driven shaft. According to this, the gears of any one of the driving gear unit and the driven gear unit are portion gears which are gears having gear teeth on respective portions of outer peripheries thereof, the gear teeth of the portion gears are alternately disposed to each other one on another.

Accordingly, upon a rotation of the driving shaft, each portion gear of any one of the driving gear unit and the driven gear unit are alternately meshed with a corresponding gear of the other one of the driving gear unit and the driven gear unit, to thereby change a rotational speed of the tray.

BRIEF DESCRIPTION OF THE DRAWINGS

The above and other objects and the advantages of the present invention will become readily apparent by reference to the following detailed description when considered in conjunction with the accompanying drawings in which.

DETAILED DESCRIPTION OF THE PREFERRED EMBODIMENT

Hereinafter, the first embodiment of the present invention according to the present invention will be described in detail with reference to the accompanying drawings.

Figure 1:
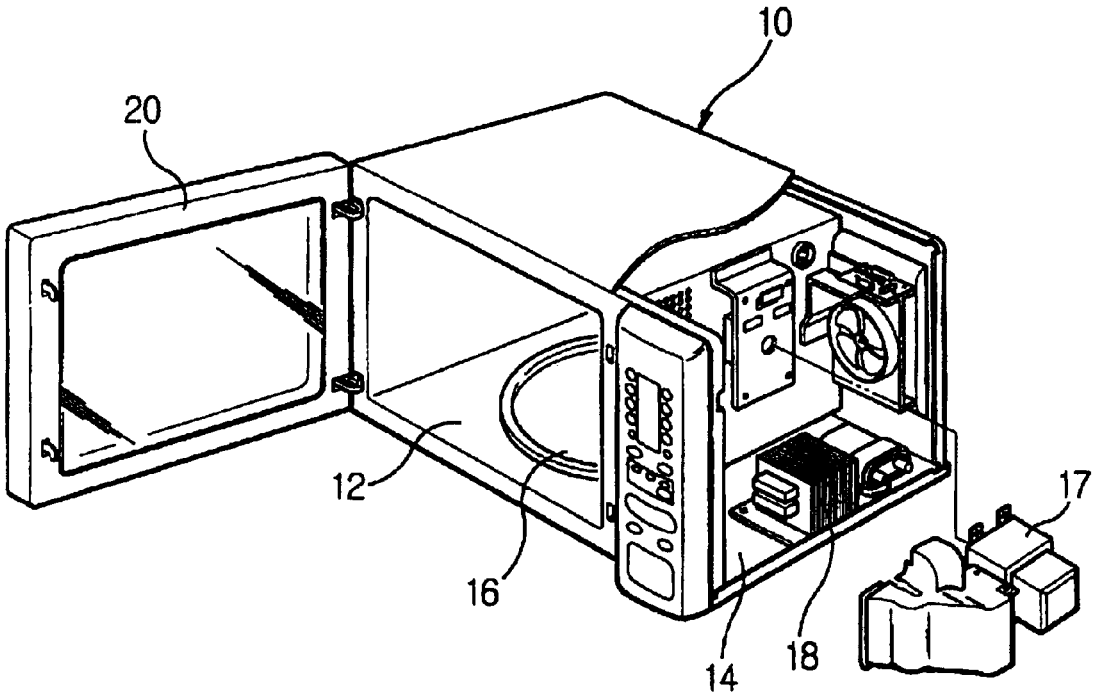
FIG. 1 (PRIOR ART)
FIG. 1 is a perspective view of a general microwave oven having a tray.
Figure 2:
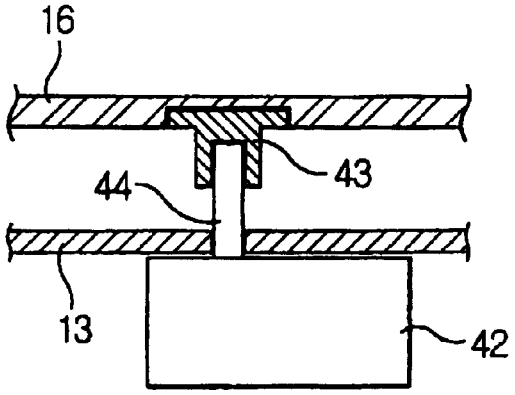
FIG. 2 (PRIOR ART)
FIG. 2 is a cross-sectioned view of a conventional tray driving apparatus.

The microwave oven to which the tray driving apparatus according to the first embodiment of the present invention is applied has the same structure as in a general microwave oven as shown in FIG. 1. That is, the body is divided into a cooking chamber and a driving chamber. Various electric components in the driving chamber are mounted for generating and guiding the microwave into the cooking chamber. A tray for placing food is mounted on the bottom of the cooking chamber, a door is mounted on the front side of the cooking chamber, and a control panel is mounted on the front side of the driving chamber.

Figure 3:
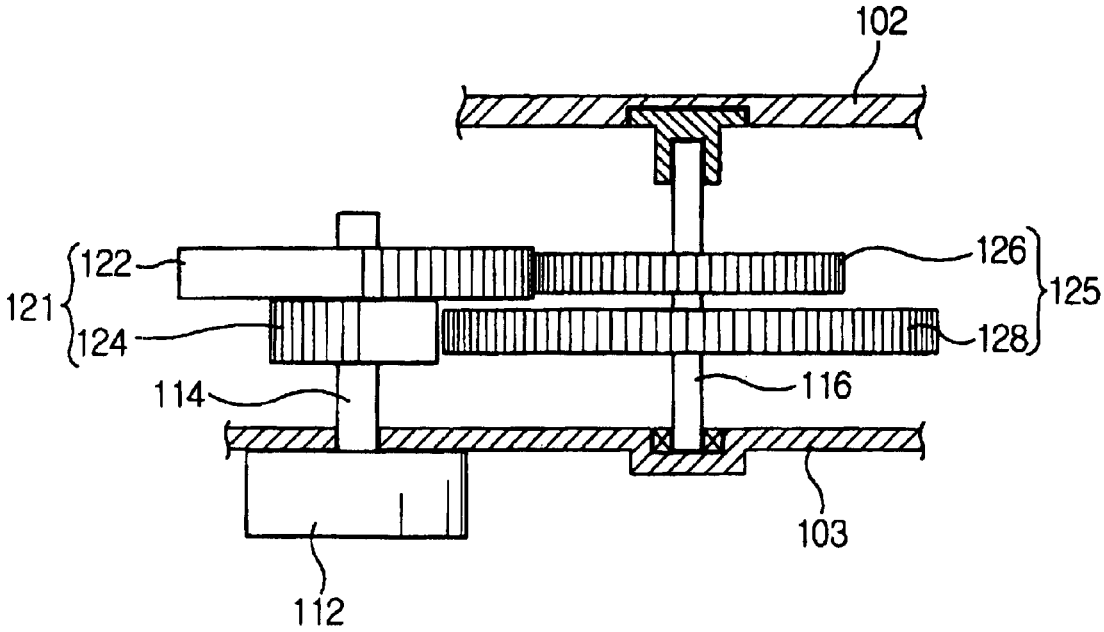
FIG. 3 is a cross-sectioned view of a tray driving apparatus *constructed* according to the first embodiment of the present invention.
Figure 4A:
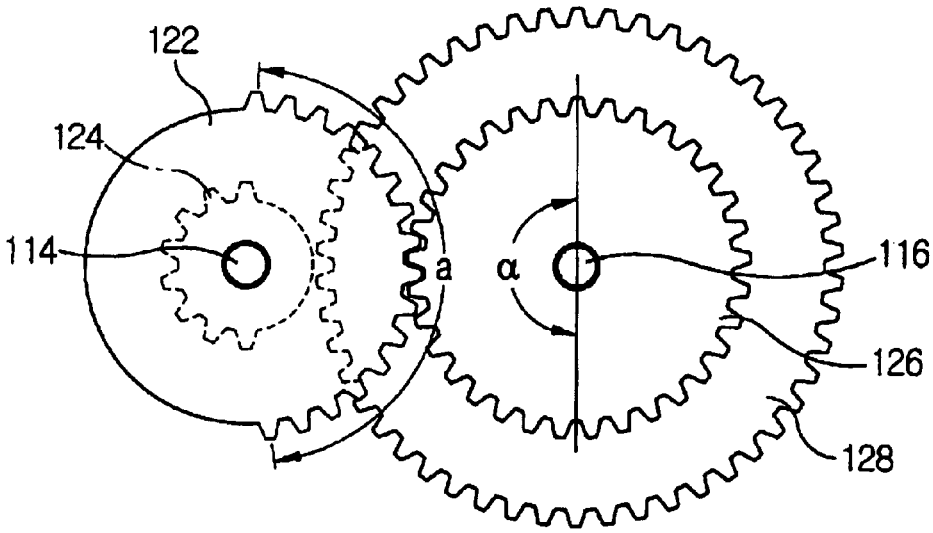
FIGS. 4A and 4B are plan views [for] showing operations of the tray driving apparatus of FIG. 3.
Figure 4B:
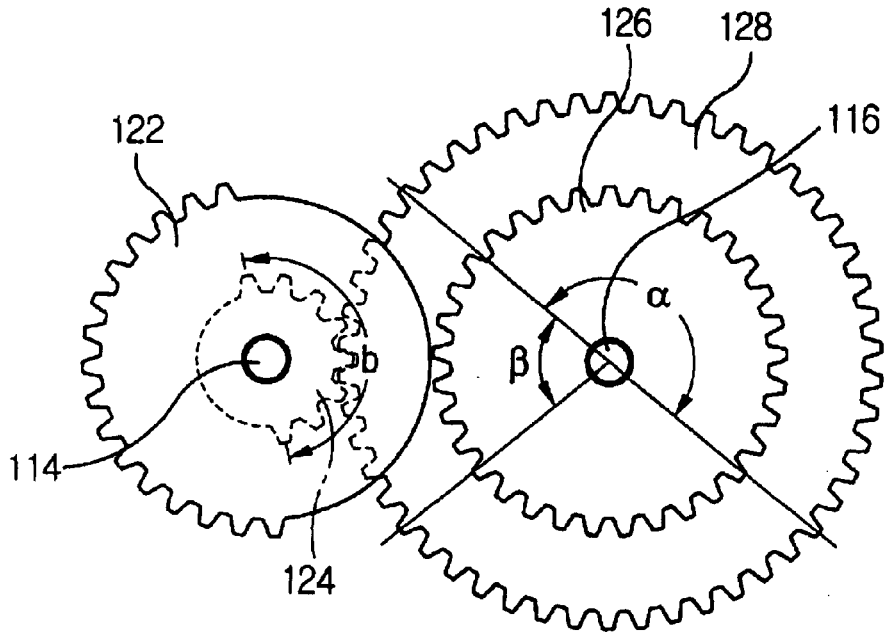

The tray driving apparatus according to the first embodiment of the present invention is mounted below the tray of the cooking chamber. FIGS. 3 to 4B show the tray driving apparatus according to the first embodiment of the present invention.

As shown in FIGS. 3 to 4B, the tray driving apparatus according to the first embodiment of the present invention includes a driving source 112 for providing a driving force, a driving shaft 114 and a driven shaft 116 for transmitting the driving force of the driving source 112 to the tray 102, and speed changing gear unit for changing a rotational speed of the tray 102 disposed between the driving shaft 114 and the driven shaft 116.

An electric motor is used as a driving source 112. The driving shaft 114 is connected to a rotator of the electric motor 114, and the driven shaft 116 is connected to the center portion of the lower bottom of the tray 102. Reference numeral 103 is a bottom panel forming the bottom side of the cooking chamber.

The speed changing gears include a driving gear unit 121 which are mounted to the driving shaft 114 and driven gear unit 125 mounted to the driven shaft 116.

The driving gear unit 121 has the first driving gear 122 and the second driving gear 124, which are portion gears alternately meshed to each other. The portion gears in the present description are gear tooth portions partially formed on the outer periphery of a gear, not entirely formed on the outer periphery. Gear teeth of the first and second driving gear 122 and 124, as shown in FIG. 4A, are formed along half the entire outer periphery, that is, from 0 degree to 180 degree along the outer periphery, of each of [the] gears 122 and 124, which are alternately disposed one on another.

The driven gear unit 125 has the first driven gear 126 and the second driven gear 128, respectively, corresponding to the first driving gear 122 and the second driving gear 124 of the driving gears.

If the cooking begins, the driving shaft 114 of the driving source 112 is rotated. The driving force of the driving shaft 114 is transmitted to the driven shaft 116 to rotate the tray 102. At this time, the rotational force of the driving shaft 114 is alternately transmitted to the driven shaft 116 through the first gears 122 and 126 and the second gears 124 and 128 of the driving gear unit 121 and the driven gear unit 125. Accordingly, the rotational speed of the tray 102 rotated by the driven shaft 116 is periodically changed.

That is, in the state that the first driving gear 122 of the driving gear unit 121 is meshed with the first driven gear 126 of the driven gear unit 125, the second driving gear 124 is in a separated state from the second driven gear 128. Accordingly, the driving force of the driving shaft 114 is transmitted to the driven shaft 116 through the first driving gear 122 and the first driven gear 126, and the tray 102 is rotated at a speed corresponding to the ratio of the first gears 122 and 126.

Here, in the state that the first driving gear 122 is meshed with the first driven gear 126, the driving shaft 114 is rotated up to 180 degrees, the driven shaft 116 is rotated up to an angle of $\alpha$ corresponding to the length of a (more precisely the number of gear teeth) which corresponds to one half of the outer periphery of the first driving gear 122 on the outer periphery of the first driven gear 126.

If the driving shaft 114 is rotated up to 180 degrees, the first driving gear 122 is separated from the first driven gear 126[.]: at the same time, the second driving gear 124 is meshed with the second driven gear 128, so that the driving force of the driving shaft 114 is, as shown in FIG. [4b] *4B*, transmitted to the driven shaft 116 through the second driving gear 124 and the second driven gear 128, and the tray 102 is rotated at a speed corresponding to the gear tooth ratio of the second gears 124 and 128. Here, [The] *the* driving shaft 114 is rotated 180° in the state that the second driving gear 124 is meshed with the second driven gear 128, and the driven shaft 116 is rotated at an angle of $\beta$ corresponding to the length of b (more precisely the number of gear teeth) corresponding to the length which corresponds to [half] *one-half* of the outer periphery of the second driving gear 124 on the outer periphery of the second driven gear 128.

As stated above, while the driving shaft 114 is rotated one time, the driving force of the driving shaft 114 is alternately transmitted to the driven shaft 116 via the first gears 122 and 126 and the second gears 124 and 128 of the driving gear unit 121 and the driven gear unit 125, so that the rotational speed of the tray 102 is periodically changed.

In the meantime, the driving gears and the driven gears of the driving gear unit 121 and the driven gear unit 125 are not [defined] *confined* to only two gears, respectively, as in the first embodiment, but can contain three to four or more gears if necessary when designed. If three gears are used for the respective gear units, the rotational speed of the tray 102 is changed in three steps.

Although the gear teeth are formed on each of the driving gears of the driving gear unit 121 on only one portion of the periphery thereof in the first embodiment, the gear teeth may be also formed on two or more portions of the periphery thereof, and in the latter case, the gear teeth of respective driving gears should be alternately meshed to each other without any interruption between them.

Preferably, when the driving shaft 114 is rotated one time, that is, rotated 360°, an angle at which the driven shaft 116 is rotated, that is, $\alpha+\beta$ or [the] *an* integer times of [the] $\alpha+\beta$, equals [to] 360° or is different from 360°. Therefore, the rotational speed of the tray 102 at a particular position in the cooking chamber in which the tray 102 is rotated is continuously changed. Accordingly, [the microwave is] *microwaves are* more evenly radiated to food.

Figure 5:
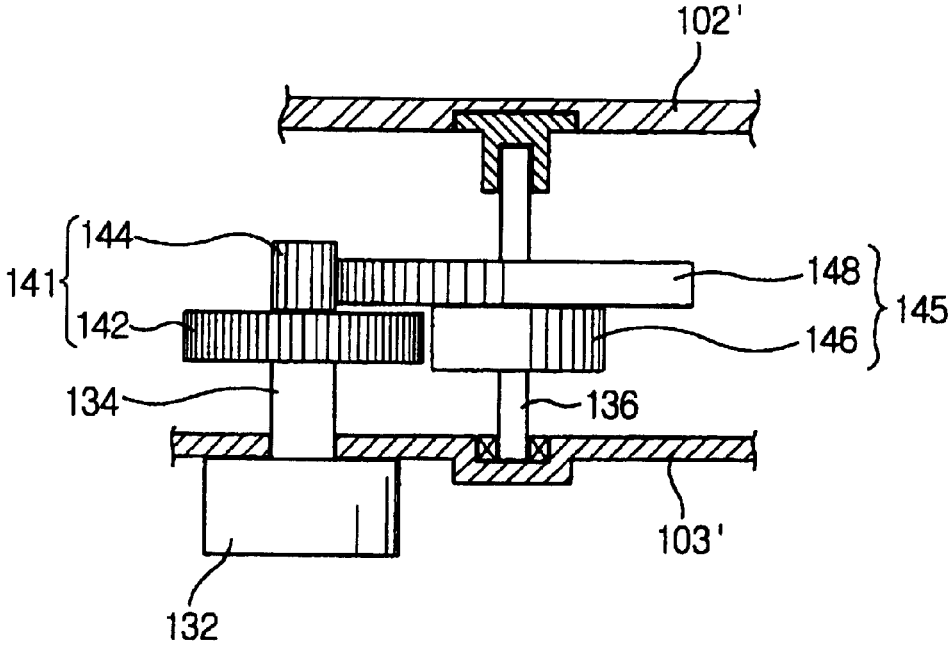
FIG. 5 is a cross-sectioned view of a tray driving apparatus *constructed* according to the second embodiment of the present invention.

In the meantime, FIG. 5 is a cross-sectioned view [for] showing a tray driving apparatus according to the second embodiment of the present invention.

The tray driving apparatus according to the second embodiment of the present invention includes a driving source 132 for providing a driving force, a driving shaft 134 and a driven shaft 136 for transmitting a driving force [of the] *from* driving source 132 to the tray 102', and a speed changing gear unit for changing the rotational speed of the tray 102' disposed between the driving shaft 134 and the driven shaft 136. The speed changing gear unit includes a driving gear unit 141 which has a first driving gear 142 and a second driving gear 144, and a driven gear unit 145 which has a first driven gear 146 and a second driven gear 148.

In the second embodiment of the present invention as stated above, as in the first embodiment, the rotational force of the driving shaft 134 is alternately transmitted through the first gears 142 and 146 and the second gears 144 and 148 of the driving gear unit 141 and the driven gear unit 145. However, since the first and second gears 146 and 148 of the driven gear unit 145 have portion gears, respectively, the period of a speed change is exactly 180°. Accordingly, the rotational speed of the tray 102' at a particular position in the cooking chamber in which the tray,102' is rotated is the same all the time. Accordingly, it is expected that the efficiency in an even radiation of [a microwave with respect to] *microwaves to the* food is lower than that in the first embodiment of the present invention.

Further, in the second embodiment of the present invention as shown in FIG. 5, it is obvious as in the first embodiment, that the number of the driven gears of the driven gear unit 145 is over two, and gear teeth [of] *on* each of the driven gears are formed on two or more portions of the outer periphery thereof.

In the tray driving apparatus of a microwave oven according to the present invention as stated above, since a driving force transmitted from the driving shaft to the driven shaft is periodically changed by the speed changing unit, the rotational speed of the tray is periodically changed. Accordingly, compared to a conventional microwave oven in which the tray is constantly rotated, [a microwave is more evenly radiated to] food *is more evenly radiated with microwaves*, so that a cooking quality for food is much more enhanced.

As stated above, a preferred embodiment of the present invention is shown and described. Although the preferred embodiment of the present invention has been described, it is understood that the present invention should not be limited to this preferred embodiment, but various changes and modifications can be made by one skilled in the art within the spirit and scope of the present invention as hereinafter claimed.

What is claimed is:

1. A tray driving apparatus of a microwave oven, comprising:

a driving source for rotating a tray disposed in a cooking chamber of said microwave oven;

a driving shaft rotated by the driving source;

a driven shaft connected to the tray and rotated together with the tray; and speed changing means for changing the rotational speed of the tray by changing the ratio of the rotational speed transmitted from the driving shaft to the driven shaft;

said speed changing means [including] *comprising*:

a driving gear unit having a plurality of driving gears, [and] mounted [to] *on* the driving shaft; and a driven gear unit having a plurality of driven gears corresponding to respective driving gears of the driving[, ear] *gear* unit, [and] mounted [to] *on* the driven shaft;

wherein gears of any one of the driving [rear] *gear* unit and the driven gear unit are portion gears [which are gears] having gear teeth on respective portions of outer peripheries thereof, so that, upon a rotation of the driving shaft, each portion gear of any one of the driving gear unit and the driven gear unit are alternately meshed with a corresponding gear of the other one of the driving gear unit and the driven gear unit, to thereby change the rotational speed of the tray.

2. The tray driving apparatus of a microwave oven as claimed in claim 1, wherein the gear teeth of each portion gear are formed on a plurality of portions of the outer periphery of each portion gear.

3. A microwave oven, comprising:

a body in which a cooking chamber is formed;

a high frequency generator for generating and radiating a high frequency into the interior of the cooking chamber;

a tray mounted to be rotated on the bottom of the cooking chamber in order for food to be securely placed;

a driving source for providing a driving force for rotating the tray;

a driving shaft rotated by the driving source;

a driven shaft connected to the tray and rotated together with the tray;

a driving gear unit having a plurality of driving gears and mounted to the driving shaft; and a driven gear unit having a plurality of driven gears corresponding to the plurality of driving gears, and mounted to the driven shaft;

wherein gears of any one of the driving gear unit and the driven gear unit are portion gears which are gears having gear teeth on respective portions of outer peripheries thereof, so that, upon a rotation of the driving shaft, each portion gear of any one of the driving gear unit and the driven gear unit is alternately meshed with a corresponding gear of the other one of the driving gear unit and the driven gear unit, to thereby change the rotational speed of the tray.

4. A tray driving apparatus of a microwave oven, comprising:

a tray;

a tray shaft fixed to said tray [and rotatably mounted on a cooking chamber];

a plurality of tray gears fixed to said tray shaft;

a driving source [mounted on said cooking chamber];

a driving shaft connected to said driving source; and first and second driving gears fixed to said driving shaft, and having a [tooth] *toothed* portion and a toothless portion, disposed to be meshed with respective tray gears, each [tooth] *toothed* portion of said first and second driving gears alternatively meshed with said respective tray gears while said driving shaft rotates by said driving source.

5. The tray driving apparatus of claim 4, with said tray gears being different from each other in diameter.

6. The tray driving apparatus of claim 4, with said first and second driving gears being different from each other in diameter.

7. The tray driving apparatus of claim 4, with the [tooth] *toothed* portion of said first driving gear being coupled to one of said tray gears while the [tooth] *toothed* portion of said second gear disconnected from the other one of said tray gears.

8. The tray driving apparatus of claim 4, with the [tooth] *toothed* portion of said first driving gear disposed to be coupled to one of said tray gears before the [tooth] *toothed* portion of said second gear is disconnected from the other one of said tray gears.

9. The tray [diving] *driving* apparatus of claim 4, with first and second driving gear having said [tooth] *toothed* portion formed on one portion of an outer peripheral surface of said first and second driving gear while said toothless portion is formed on [the other] *a* remaining portion of said outer peripheral surface of said first and second driving gear.

10. The tray driving apparatus of claim 4, wherein the [tooth] *toothed* portion of said first driving gear and the toothless portion of said second driving gear are formed on one area around said driving shaft while the toothless portion of said first driving gear and the [tooth] *toothed* portion of said second driving gear are formed on the other area around said driving shaft.

11. The tray driving apparatus of claim 4, with said tray rotating with a first rotational speed when the [tooth] *toothed* portion of said first driving gear is coupled to the corresponding tray gear and with a second rotational speed when the [tooth] *toothed* portion of said second driving gear is coupled to the corresponding tray gear while said driving shaft [rotates] *is rotated* by said driving source.

12. A tray driving apparatus of a microwave oven, comprising:

a tray disposed in a cooking chamber;

a tray shaft coupled to said tray [and rotatably mounted on a cooking chamber];

a tray gear unit fixed to said tray shaft, having a first gear [tooth] *toothed* portion and a second gear [tooth] *toothed* portion;

a driving source [mounted on said cooking chamber];

a driving shaft coupled to said driving source;

a driving gear unit fixed to said driving shaft, having a third gear [tooth] *toothed* portion disposed to be meshed with said first gear [tooth] *toothed* portion and a fourth gear [tooth] *toothed* portion disposed to be meshed with said second gear [tooth] *toothed* portion; and said third gear [tooth] *toothed* portion and said fourth gear [tooth] *toothed* portion alternatively meshed with the corresponding first gear [tooth] *toothed* portion and second gear [tooth] *toothed* portion while said driving shaft rotates by said driving source.

13. The tray driving apparatus of claim 12, with said tray gear unit comprising a first gear having said first gear [tooth] *toothed* portion and a second gear having said second gear [tooth] *toothed* portion, said first and second gears fixed to said tray shaft and rotating about an axis passing through a center of said tray shaft.

14. The tray driving apparatus of claim 13, with said first and second gears being different from each other in diameter.

15. The tray driving apparatus of claim 12, with said driving gear comprising a third gear having said third gear [tooth] *toothed* portion and a fourth gear having said fourth gear [tooth] *toothed* portion, said third and fourth gears fixed to said driving shaft and rotating about an axis passing through a center of said driving shaft.

16. The tray driving apparatus of claim 15, with said third and fourth gears being different from each other in diameter.

17. The tray driving apparatus of claim 15, with said third gear [tooth] *toothed* portion foamed on a portion of an outer peripheral surface of said third gear in one area around said driving shaft while said fourth gear [tooth] *toothed* portion is formed on a portion of an outer peripheral surface of said fourth gear in the other area around said driving shaft.

18. The tray driving apparatus of claim 17, with said third gear [tooth] *toothed* portion of said third gear meshed with said first [geartooth] *toothed* portion while said fourth gear [tooth] *toothed* portion of said fourth gear is disconnected to said second gear [tooth] *toothed* portion.

19. The tray driving apparatus of claim 12, with said tray rotating with a first rotational speed when third gear [tooth] *toothed* portion is meshed with said first gear [tooth] *toothed* portion and a second rotational speed when said fourth gear [tooth] *toothed* portion is meshed with said second gear portion while said driving shaft rotates by said driving source.

*20. A microwave oven, comprising:*

*a body having an interior cooking chamber;*

*a high frequency generator radiating high frequency energy into said cooking chamber;*

*a tray mounted on a bottom of said cooking chamber;*

*a driving shaft;*

*a driven shaft rotatably connected to said tray;*

*a first drive unit comprising a plurality of driving gears mounted on said driving shaft;*

*a second drive unit comprising a plurality of driven gears mounted on the driven shaft operationally aligned to mesh in different gear ratios with different ones of said driving gears; and*

*a first one of said plurality of driving gears and said plurality of driven gears comprising an assembly of sector gears having gear teeth along different respective arcuate portions of outer peripheries thereof alternately meshing with corresponding gears of a second*

*one of said plurality of driving gears and said plurality of driven gears to vary rotational speeds of said tray in dependence upon said ratios.*

*21. A microwave process, comprising:*

*positioning a tray within an interior cooking chamber of a microwave oven;*

*radiating high frequency energy into said cooking chamber; and*

*varying rotational speeds of said tray within said cooking chamber while radiating high frequency energy into said cooking chamber by successively meshing different ones of a first plurality of gears comprised of sector gears providing different arcuate sectors of rotation with operationally aligned gears of a second plurality of gears.*

*22. The microwave process of claim 21, comprised of varying said rotational speeds by alternately meshing said sector gears and said operationally aligned gears in different gear ratios.*

*23. The microwave process of claim 21, comprised of:*

*assembling a first one of a plurality of driving gears and a plurality of driven gears from a plurality of said sector gears having gear teeth along different respective arcuate sectors of outer peripheries thereof;*

*aligning said plurality of driving gears with different corresponding ones of said plurality of driven gears in different gear ratios; and*

*alternately meshing corresponding gears of said first plurality of driving gears and said plurality of driving gears to said vary rotational speeds of said tray in dependence upon said ratios.*

*24. A microwave process, comprising:*

*positioning a tray within an interior cooking chamber of a microwave oven;*

*radiating high frequency energy into said cooking chamber;*

*a driving shaft;*

*a driven shaft rotatably connected to said tray;*

*driving a first drive unit comprising a plurality of driving gears with different corresponding driven gears of a second drive unit operationally aligned to mesh in different gear ratios with different ones of said driving gears, where a first one of said plurality of driving gears and said plurality of driven gears comprise an assembly of sector gears having gear teeth along different respective arcuate portions of outer peripheries thereof; and*

*alternately meshing said sector gears with corresponding gears of a second one of said plurality of driving gears and said plurality of driven gears to vary said rotational speeds of said tray in dependence upon said ratios.*

*25. A microwave oven, comprising:*

*a body providing an interior cooking chamber;*

*a high frequency generator radiating high frequency energy into said cooking chamber;*

*a tray mounted within said cooking chamber; and*

*a drive unit comprised of a plurality of sector gears aligned to mesh sequentially with a second plurality of gears, with said drive unit operationally engaging said tray and automatically varying rates of rotation of said tray while said tray rotates through successive arcuate sectors of rotation within said cooking chamber.*

*26. The oven of claim 25, with said drive unit rotating said tray at different said rates of rotation as said tray travels through said successive arcuate sectors.*

*27. The oven of claim 25, with said drive unit comprising:*

*a driven shaft connected to rotate said tray at said different rates of rotation;*

*a driving shaft;*

*a first assembly comprised of a plurality of driven gears mounted on said driven shaft; and*

*a second assembly comprised of a plurality of driving gears mounted on said driving shaft and operationally aligned to mesh over different ones of said successive arcuate sectors in different gear ratios with different ones of said driven gears.*

*28. The oven of claim 25, with said drive unit comprising:*

*a driven shaft connected to rotate said tray at said different rates of rotation;*

*a driving shaft;*

*a first assembly comprised of a plurality of driven gears coaxially mounted on said driven shaft;*

*a second assembly comprised of a plurality of driving gears coaxially mounted on said driving shaft and operationally aligned to mesh in different gear ratios with different ones of said driven gears over different ones of said arcuate sectors; and*

*one of said first assembly and said second assembly comprising a plurality of sector gears bearing teeth along different peripheral sectors, alternately meshing with corresponding gears of a second one of said first assembly and said second assembly, to vary said rates of rotation of said tray in dependence upon said ratios.*

*29. A microwave process, comprising:*

*positioning a tray to rate around an interior of a cooking chamber in a microwave oven;*

*radiating high frequency energy into said cooking chamber; and*

*varying rotational speeds of said tray within said cooking chamber by meshing a plurality of sector gears aligned to mesh sequentially with different corresponding ones of a second plurality of gears to automatically change said rotational speeds periodically while said tray rotates through successive arcuate sectors of rotation within said cooking chamber.*

*30. A microwave process of claim 28, further comprised of alternately meshing different ones of said plurality of driving gears with corresponding ones of said second plurality of gears in different gear ratios.*

*31. The process of claim 28, further comprised of varying said rotational speeds by alternately meshing different ones of a first plurality of gears coaxially mounted on a shaft with corresponding ones of a plurality of sector gears bearing teeth along different arcuate peripheries thereof, as said tray rotated through said successive arcuate sectors.*

* * * * *